United States Patent [19]
Smith et al.

[11] Patent Number: 5,620,594
[45] Date of Patent: Apr. 15, 1997

[54] WATER MANAGEMENT SYSTEM

[75] Inventors: Robert M. Smith, Bechin; John E. Adams, Montrose; James E. Delves, Bristol, all of United Kingdom

[73] Assignee: Merpro Tortek Limited, Scotland

[21] Appl. No.: 491,864

[22] PCT Filed: Dec. 29, 1993

[86] PCT No.: PCT/GB93/02667

§ 371 Date: Aug. 22, 1995

§ 102(e) Date: Aug. 22, 1995

[87] PCT Pub. No.: WO94/16157

PCT Pub. Date: Jul. 21, 1994

[30] Foreign Application Priority Data

Dec. 30, 1992 [GB] United Kingdom ............... 9227130
Feb. 19, 1993 [GB] United Kingdom ............... 9303389
May 24, 1993 [GB] United Kingdom ............... 9310641
Aug. 26, 1993 [GB] United Kingdom ............... 9317745

[51] Int. Cl.⁶ ................................................. B01D 21/00
[52] U.S. Cl. .................. 210/167; 210/170; 210/195.1; 210/257.1; 210/523
[58] Field of Search .................................. 210/153, 167, 210/170, 175, 182, 195.1, 257.1, 258, 259, 512.1, 521, 523, 532.1

[56] References Cited

U.S. PATENT DOCUMENTS

| | | | |
|---|---|---|---|
| 223,826 | 1/1880 | Waring | 210/532.1 |
| 2,782,929 | 2/1957 | Colket | 210/532.1 |
| 3,396,102 | 8/1968 | Forrest | 210/259 |
| 3,537,583 | 11/1970 | Wahner et al. | 210/532.1 |
| 3,543,294 | 11/1970 | Boester | 210/170 |
| 4,017,395 | 4/1977 | Davis | 210/167 |
| 4,096,066 | 6/1978 | Kearney | 210/523 |
| 4,162,218 | 7/1979 | McCormick | 210/167 |
| 4,228,006 | 10/1980 | Hanna | 210/167 |
| 5,106,493 | 4/1992 | McIntosh | 210/167 |
| 5,192,426 | 3/1993 | DeCoster et al. | 210/170 |
| 5,217,609 | 6/1993 | Holdeman | 210/532.1 |

FOREIGN PATENT DOCUMENTS

| | | |
|---|---|---|
| 420961 | 2/1972 | Australia . |
| 47347 | 3/1982 | European Pat. Off. . |
| 1642826 | 4/1971 | Germany . |
| 2710617 | 9/1978 | Germany . |

*Primary Examiner*—Christopher Upton
*Attorney, Agent, or Firm*—Andrus, Sceales, Starke & Sawall

[57] ABSTRACT

A water management system is disclosed comprising a first distribution system having a wastewater outlet connected to a settling chamber, which has an overflow to a discharge chamber. The settling chamber has a means for removing settled solids comprising a fluidizing duct having a supply unit connected to a source of water under pressure and a discharge duct within the supply duct for discharge of a slurry of solids from the settling chamber. The discharge chamber is connected to a storage tank for supplying treated water to a second water distribution system.

20 Claims, 4 Drawing Sheets

WATER MANAGEMENT SYSTEM

BACKGROUND AND SUMMARY OF THE INVENTION

In large institutions such as hospitals and schools, the need for reducing water consumption is widely recognised as providing significant financial savings and environmental benefits. Furthermore, measures such as water metering have created a new demand for water saving measures in domestic applications.

According to the present invention, a water management system comprises a first water distribution system having a waste water outlet connected to an inlet of a settling chamber, the settling chamber having an overflow to a discharge chamber; and means associated with the lower part of the settling chamber for removing heavier than water contaminants therefrom; the discharge chamber having an outlet connected to a storage tank for supplying cleansed water from the first distribution system to a second water distribution system.

This waste water management system is capable of collecting and cleaning water from, for example, baths, handbasins and showers, and distributing the cleansed water to, for example, W.C.s and urinals. This provides a considerable reduction in overall water consumption.

The means associated with the lower part of the settling chamber for removing heavier than water contaminants may be a jet pump or an outlet duct communicating with the lower part of the settling chamber. However, a particularly effective means for removing the solid contaminants which allows the settling chamber to be automatically cleaned without any moving pump parts coming into contact with the contaminants and without interrupting the operating of the water management system is a fluidising unit comprising a supply duct which is arranged to be fed with water under pressure, and a discharge duct within the supply duct and projecting beyond the outlet of the supply duct for the discharge of a slurry of the solid contaminants from the settling chamber. The operation of the fluidising unit is improved when the water ejected from the supply duct is caused to swirl. The supply duct of the fluidising unit can be fed with a fresh supply of water from outside the water management system. However, it is convenient to feed the supply duct of the fluidising unit with water from the discharge chamber.

In order to facilitate start up of the fluidising unit, the discharge duct is preferably provided with an injector which is arranged to inject liquid to create a low-pressure region within the discharge duct. The injector is preferably fed by a bleed off line from the fluidising unit supply duct.

The water management system is preferably run by a common pump which is arranged both to pump water from the discharge chamber to the storage tank and to pump the water to the supply duct of the fluidising unit preferably at different times.

The cleansed water being supplied to the second water distribution system may still contain some contaminants, such as soap suds which are lighter than water. Therefore, some secondary separation and/or chemical treatment means may be provided for treating the water passing from the discharge chamber to the storage tank. The secondary separation means is preferably a hydrocyclone by means of which lighter than water contaminants are discharged from the water through the hydrocyclone overflow outlet. The hydrocyclone provides a compact secondary separator which can be simply driven by the (common) pump, the hydrocyclone underflow outlet preferably being connected to the storage tank.

The chemical treatment means may comprise means for adding chlorine, acid, alkali, scent or colour to the water. The various chemicals can be added to the water to make it more suitable for use in W.C.s and urinals. The water can be chlorinated so that it will not support bacteria thereby avoiding the need for further treatment of water in a W.C. or urinal such as by means of sanitised blocks. Alternatively the pH level of the water can be adjusted to assist in the subsequent treatment of sewage. A coloured die can be added to the water so that it is readily distinguishable from the potable water from the first water distribution system.

The settling and discharge chambers may be separate units connected by a pipe. However, to provide a more compact unit, the settling and discharge chambers are provided in a common tank, and separated by a weir which forms the overflow.

Further modifications to the water management system may include a rain water collection system having an outlet connected to the settling chamber, and/or a heat exchanger for recovering waste heat from water from the first distribution system. The former is particularly useful in, for example, factories and offices where the water in the first water distribution system is otherwise limited, while the latter is particularly useful in, for example, hospitals and hotels where a lot of hot water is used in the first water distribution system.

The waste water management systems described above can be supplied as a set of separate interconnectable components. This may be sufficient in larger buildings where space is readily available, for example alongside an air conditioning system or in a boiler room. However, for domestic applications a compact unit is desirable. In this case, the water management system may be supplied as a unitary tank being formed of a plastic material and being divided by partitions into compartments, a first compartment providing the settling chamber, a second compartment providing the discharge chamber, the weir being formed by a upper edge of one of the partitions separating the first and second compartments; a third compartment containing the hydrocyclone; and a fourth compartment providing a drain and having a contaminant outlet at its lower part, the discharge duct from the fluidising unit discharging into the drain compartment and the overflow outlet from the hydrocyclone discharging into the drain compartment; and the pump being mounted to the tank. Such a unit can be made sufficiently compact that it can be fitted under a kitchen sink.

BRIEF DESCRIPTION OF THE DRAWINGS

Two examples of a water management systems constructed in accordance with the present invention will now be described with reference to the accompanying drawings in which.

DETAILED DESCRIPTION OF THE PREFERRED EMBODIMENT

Figure 1:
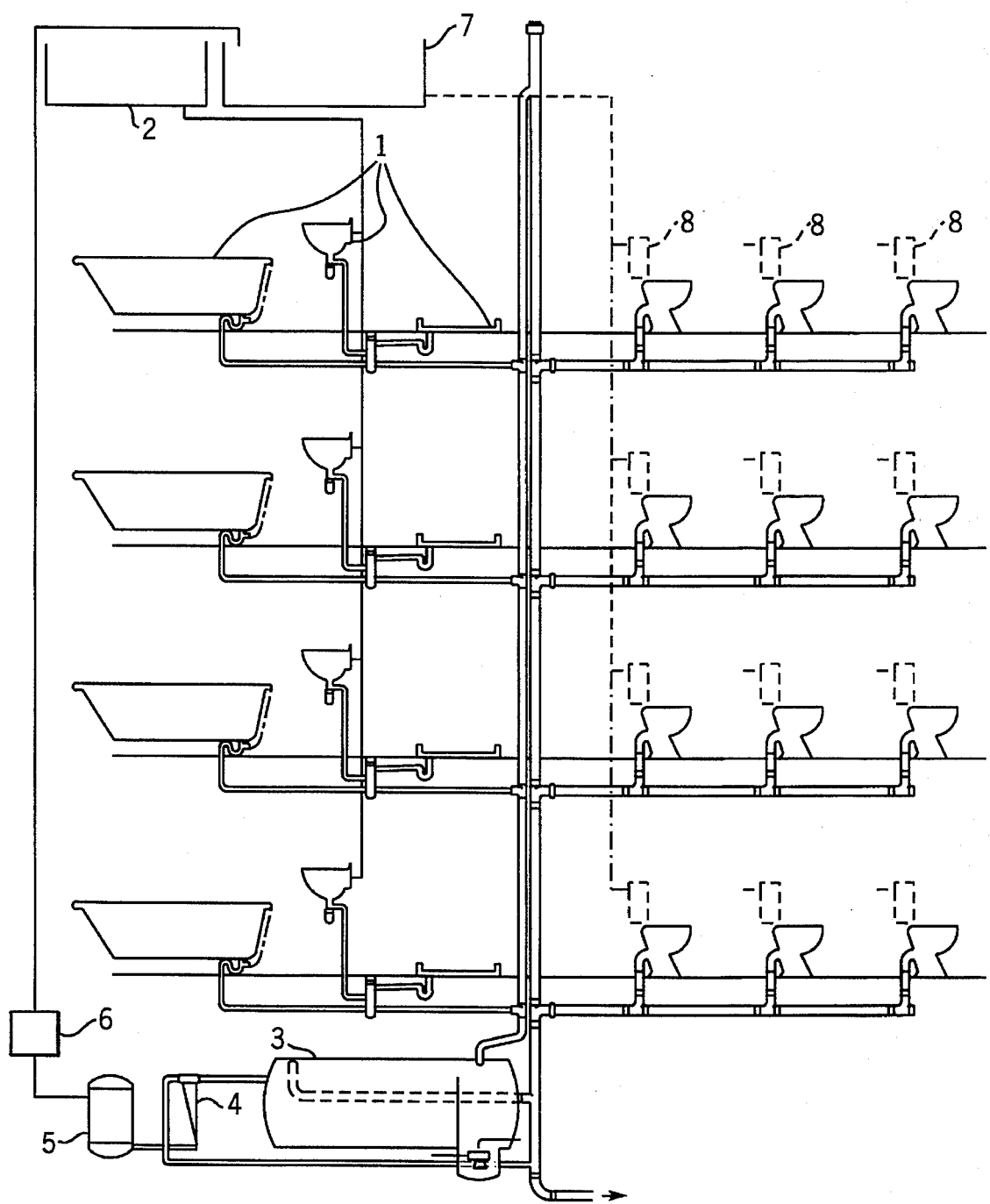
FIG. 1 shows diagrammatically how the water management system is installed in a building.

As shown in FIG. 1, a first water distribution system 1 consisting of baths, basins and showers is fed with water from a conventional mains water storage tank 2 and drains into a holding tank 3 in which it undergoes an initial separation to remove heavier than water contaminants in a manner described below. The cleansed liquid is then pumped, via a secondary cleansing stage consisting of a hydrocyclone 4 and a cartridge filter 5, and a chemical dosing unit 6 to a roof tank 7. The water is stored in the roof tank 7 before being distributed to a second water distribution system 8 consisting of W.C.s which have conventional outlets into an underground drain.

Figure 3:
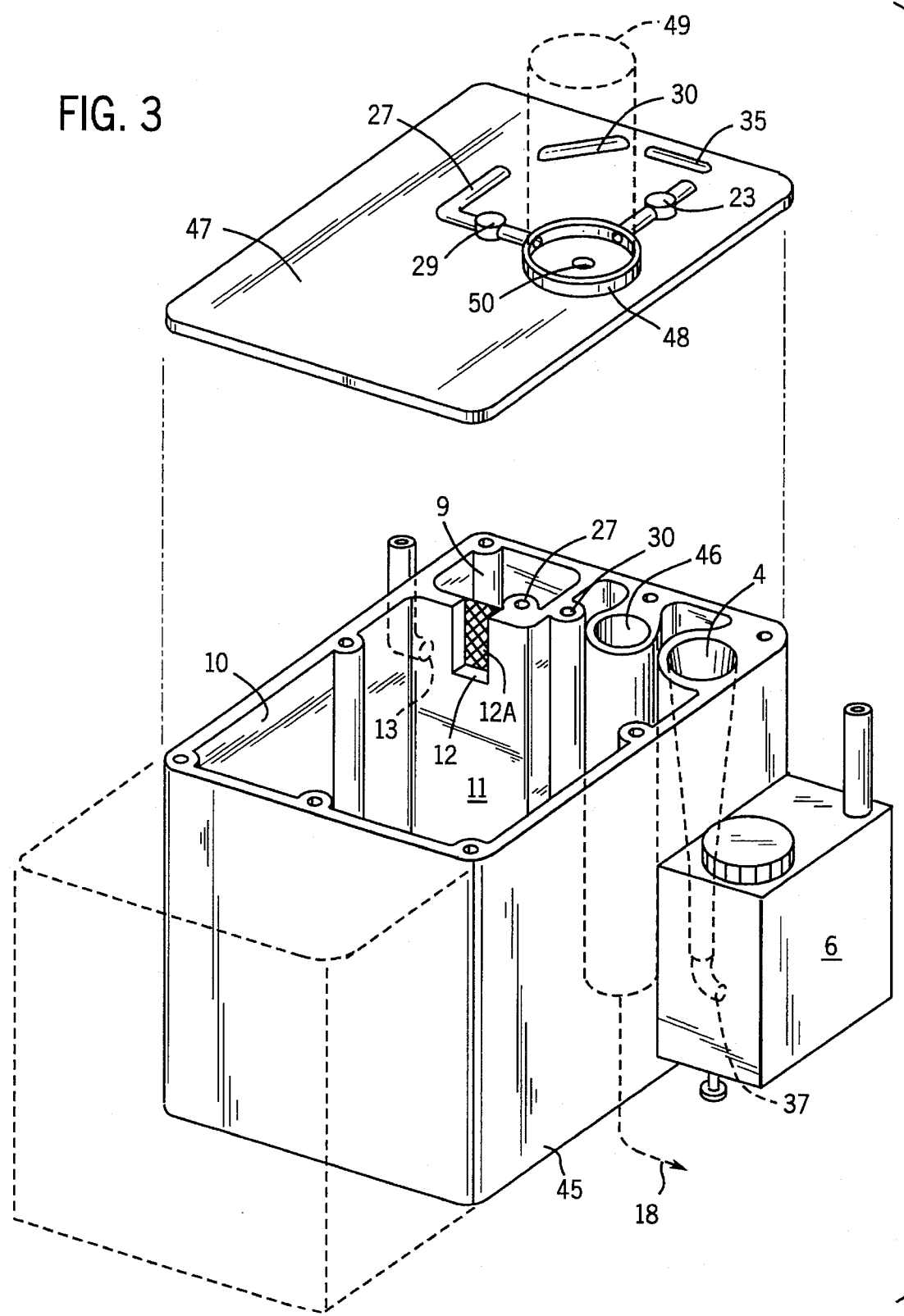
FIG. 3 is an exploded perspective view of a unitary tank used with a second example of the water management system.

The water management system is shown in greater detail in FIG. 3.

The holding tank 2 is divided into a settling chamber 9 and a discharge chamber 10 by an internal wall 11 which has an upper edge providing a weir 12. A screen 12A covers the weir to trap solids which have not settled out of the liquid during periods of high flow. An inlet 13 is provided into the settling chamber for the water from the first water distribution system 1. This flow of water is controlled by an inlet valve 14.

A heat exchanger 15 is provided for the recovery of heat from the water in the first water distribution system.

A rain water collection system 16 comprising a system of gutters has an outlet which leads to the inlet 13 via a trap 17, and a separate outlet 18 below the heat exchanger 15 so that the heat exchanger can be bypassed by the rain water.

A portion of the settling chamber 9 extends below the level of the rest of the holding tank 3 to provide a well 19 for heavier than water particles which have settled out of the water. In the well 19 is a fluidising unit 20 for the periodic removal of the heavy contaminants as described below. The discharge chamber 10 has an outlet 21 on which is fitted a strainer 22 providing an additional means of separating out solid contaminants. The outlet flow is controlled by an outlet valve 23. A water level detector 24 is provided in the discharge chamber 10 and detects the presence of water at upper and lower levels. The discharge chamber 10 has an overflow outlet 25, the flow through which is controlled by an overflow valve 26.

The fluidising unit 20 is of the general kind described in our earlier U.S. Pat. Nos. 4,978,251, 4,952,099 and 4,992,006. The unit 20 comprises a liquid supply duct 27 which receives water from the outlet 21 of the discharge chamber 10, the flow of which is driven by a pump 28 and controlled by a liquid supply duct valve 29. A discharge duct 30 is provided, the end of which is within the liquid supply duct 27, and has an inlet 31 which projects beyond the outlet 32 of the liquid supply duct 27. The discharge duct 30 leads to a drain 33 via a discharge valve 34. The water leaving the outlet 32 of the liquid supply duct 27 can be caused to swirl, either by the liquid supply duct having a tangential entry into a chamber above the outlet 32, or by helical vanes in the end of the liquid supply duct.

A jet pump in the form of an injector which injects water into the discharge duct 30 is fed by a bleed off line 27a leading from the liquid supply duct 27.

The outlet 21 from the discharge chamber 10 of the holding tank 3 leads to a secondary separation phase in the form of a liquid/liquid hydrocyclone 4 and a cartridge filter 5.

The parameters of the hydrocyclone 4 are such that contaminants which are lighter than water are discharged through the overflow 35 to the drain 33 through hydrocyclone overflow valve 36. The screen covering the weir 12 may be sized so that any solid contaminants passing through it are small enough to be rejected by the hydrocyclone. The cleansed liquid is discharged through the underflow 37 and is fed to the cartridge filter 5 under the control of hydrocyclone underflow valve 38.

The outlet of the cartridge filter 5 leads to a chemical dosing unit 6 and is controlled by a filter outlet valve 39. A pressure detector 40 measures the pressure drop across the cartridge filter 5 and indicates when the cartridge filter needs cleaning.

The outlet of the chemical dosing unit 6 leads to a roof tank 7 where the water is stored ready for use in the second water distribution system 8. The water from the discharge chamber 10 is pumped through the secondary separation phase and the chemical dosing unit 6 to the roof tank 7 by the pump 28. The roof tank 7 has an overflow outlet 41 and a water level detector 42. A back-up supply 43 of mains water leads to the roof tank 7 and is controlled by a back-up valve 44. To prevent cross contamination between the supplies, it is necessary to prevent water flowing from the roof tank 7 to the back-up supply 43 of mains water. This can be achieved either by means of an air gap, or by making the back-up valve 44 a non-return or flap valve which allows flow from the back-up supply 43 to the roof tank 7, but not in the opposite direction.

A control system receives signals from the pump 28, the level detectors 24, 42 in the discharge chamber 10 and the roof tank 7, and outputs signals to control the operation of the valves as described below.

In normal operation, the inlet 14, outlet 23, hydrocyclone overflow 36, hydrocyclone underflow 38 and filter outlet 39 valves are open, and the overflow 26, liquid supply duct 29, discharge 34 and back-up 44 valves are closed. Contaminated water is fed into the settling chamber 9 where solid contaminants settle out into the trap 19. The water, which is generally free of heavy contaminants, flows over the weir 12 and into the discharge chamber 10. Any larger solids which have not settled, for example, during periods of high flow, are prevented from crossing the weir 12 by the screen 12A and eventually settle when flow recedes. On operation of the pump 28, water is fed from the holding tank 3 via the hydrocyclone 4, filter 5 and chemical dosing unit 6 to the roof tank 7.

The level of water in the discharge chamber 10 is controlled so that it remains between the upper and lower levels detected by the level detector 24. If the level detector 42 in the roof tank 7 detects that the level in the roof tank has fallen below an acceptable level, then back-up valve 44 is opened and the roof tank 7 is filled with water from the back-up supply 43. If both level detectors 24, 42 detect that the discharge chamber 10 and the roof tank 7 are at their maximum levels, then the overflow valve 26 is opened to allow excess water to drain from the discharge chamber.

If the failure of the pump 28 is detected, the discharge 34 and hydrocyclone overflow 36 valves are closed and the overflow 26 and back-up 44 valves are open. Thus any surplus liquid in the discharge chamber 10 is drained to the sewer and the roof tank 7 is fed with water from the back-up supply 43.

The fluidising unit 20 is automatically triggered after the pump 28 has run for a given number of aggregate cycles, revolutions or hours emptying the discharge tank. At this time, the inlet 14, outlet 23, overflow 26 and hydrocyclone overflow 36 valves are closed and the liquid supply duct 29 and discharge 34 valves are opened. A weir valve (not shown) may be used to close the weir, thereby sealing the settling chamber 9 so that the pressure can be increased to generate sufficient head to drive the fluidising unit 20. This is unnecessary if there is already sufficient head in the settling chamber 9 or if the jet pump is provided. Water is then pumped from the discharge chamber 10 by the pump 28 to the liquid supply duct 27 of the fluidising unit. This water is caused to swirl as it leaves the outlet 32 of the liquid supply duct 27, thereby fluidising the heavy contaminants in the trap 19 forming a slurry of contaminants which are forced into the discharge duct 30 and hence to the drain 33. Simultaneously water is supplied through the bleed off line 27A to the jet pump. This is injected into the discharge duct 30 and creates a region of low pressure which assists in starting up the fluidising unit.

Figure 2:
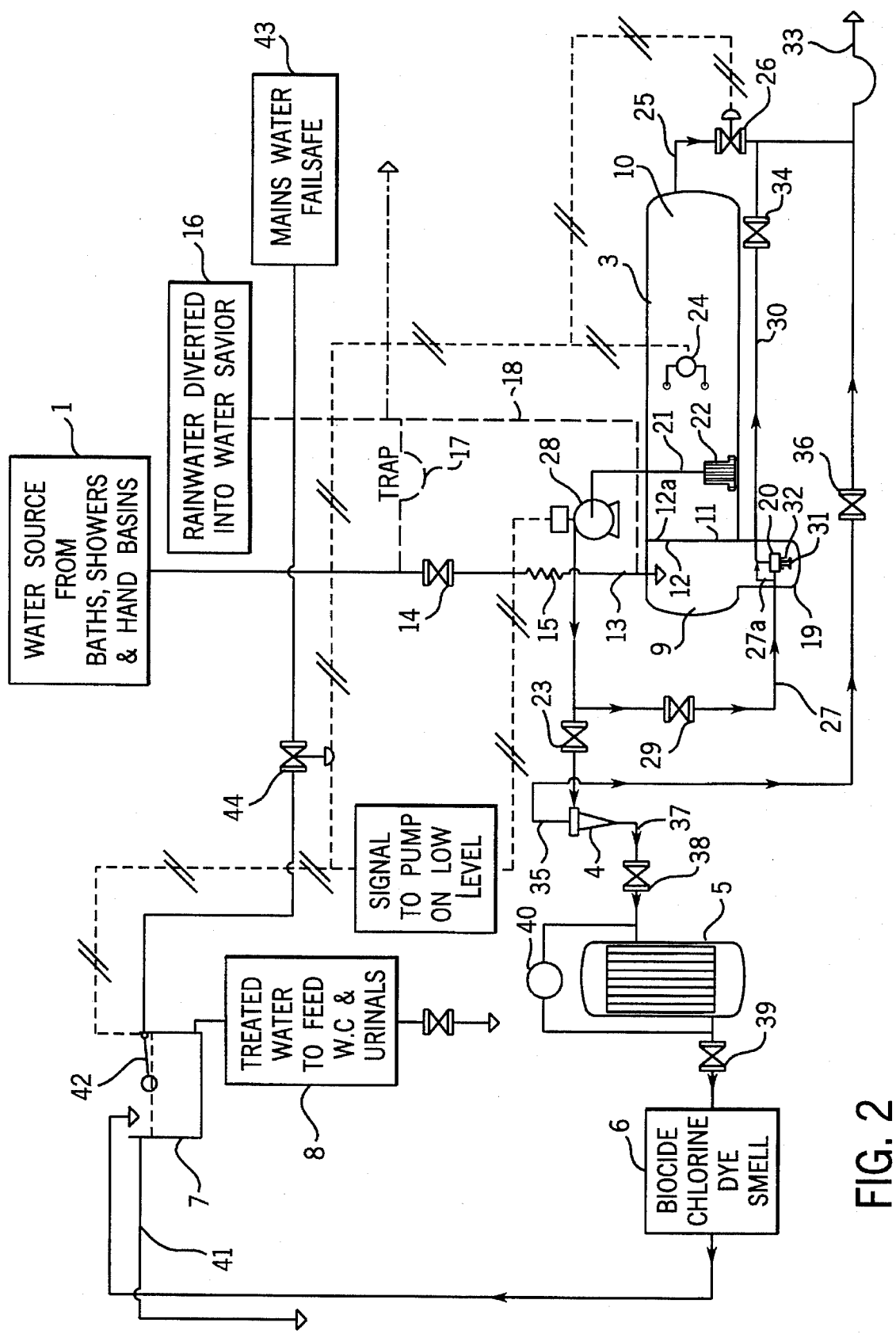
FIG. 2 is a diagrammatic overview of the water management system.
Figure 4:
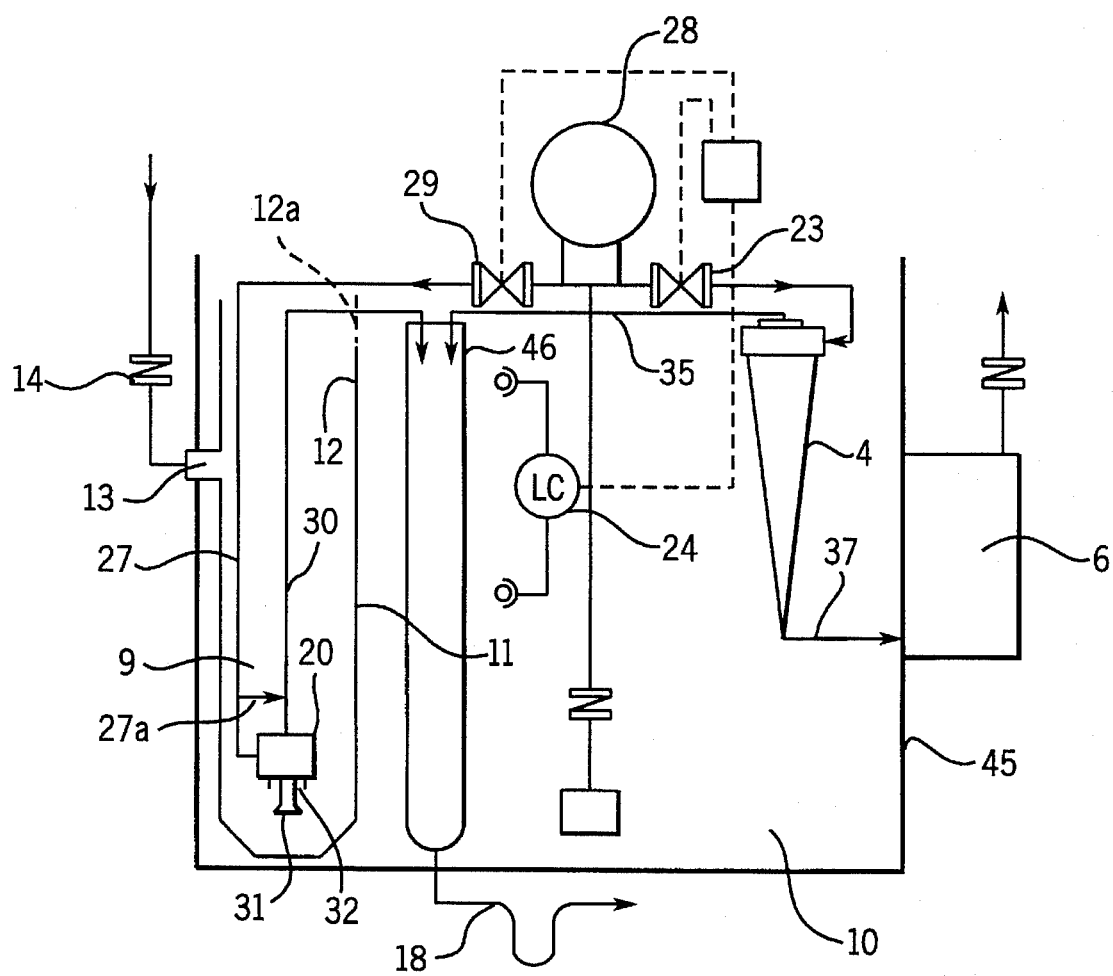
FIG. 4 shows diagrammatically the unitary tank of FIG. 3.

A modified system is shown in FIGS. 3 and 4. The main difference between this system and that described with reference to FIGS. 1 and 2 is that a unitary tank 45 contains all the elements of the holding tank 3 as well as the hydrocyclone 4. The system has no cartridge filter and the chemical dosing unit 6 is mounted directly to the side of the tank 45.

The example has various other structural modifications described below.

In addition to the settling chamber 9, discharge chamber 10 and hydrocyclone 4, the tank 45 contains a drain compartment 46 into which the discharge duct 30 from the fluidising unit 20 and the overflow 35 of the hydrocyclone 4 lead. The drain compartment 46 may also have an inlet for the overflow from the discharge chamber 10.

The fluidising unit 20 will be manufactured separately and located within the settling chamber 9. There may be a removable portion (not shown) in the bottom of the settling chamber allowing easy access if the bottom of the chamber or the fluidising unit becomes blocked.

The tank 45 is covered by a lid 47. This is provided with communication channels which communicate with channels in the tank 45 to link the elements of the system as shown in FIG. 4. The lid 47 is further provided with a rib 48 for location of a motor 49 which drives the pump 28. A communicating hole 50 is provided for the spindle of the motor 49 to the pump 28. This ensures that the motor 49 is kept away from the wet areas.

The inlet 13 enters through the side of the tank 45 and may be a downwardly directed bent pipe. This ensures that the water has sufficient retention time in the settling chamber 9 for the heavy contaminants to settle out so that they are not still entrained in the water when it flows over the weir 12.

The tank 45 can be modular so that the capacity of the system can be increased simply by increasing the size of the discharge chamber 10 as shown by dotted lines in FIG. 3. This leaves the complicated moulding section incorporating the settling chamber 9, drain compartment 46 and hydrocyclone 4 unchanged for all applications. If necessary, the pump 28 can be upgraded. Such a unit can be readily installed requiring only a source of power for the pump 28 and three connections, one for the inlet from the first water distribution system 1, a second for the drain 18 and a third for the outlet to the roof tank 7. The unit is designed to be small enough to fit under a kitchen sink.

It is predicted that, in a typical household, this system will reduce water consumption by 36%.

We claim:

1. A water management system comprising a first water distribution system having a waste water outlet connected to an inlet of a settling chamber for supplying waste water to the settling chamber, the settling chamber having an overflow to a discharge chamber; and means positioned in the lower part of the settling chamber for removing heavier than water contaminants from the waste water, the means for removing said contaminants comprising a fluidising unit having a supply duct connected to a supply of water under pressure, and a discharge duct within the supply duct for the discharge of a slurry of said contaminants from the settling chamber; the discharge chamber having an outlet connected to a storage tank for supplying cleansed water from the first distribution system to a second water distribution system.

2. A system according to claim 1, wherein the discharge duct projects beyond the outlet of the supply duct.

3. A system according to claim 2, wherein the fluidising unit has means for causing water ejected from the supply duct to swirl.

4. A system according to claim 3, wherein the discharge duct is provided with an injector to inject liquid to create a low-pressure region within the discharge duct.

5. A system according to claim 3, wherein the supply duct of the fluidising unit is connected to the discharge chamber such that the supply duct of the fluidising unit is fed with water from the discharge chamber.

6. A system according to claim 5, wherein a common pump is arranged both to pump water from the discharge chamber to the storage tank and to pump the water to the supply duct of the fluidising unit.

7. A system according to claim 2, wherein the discharge duct is provided with an injector to inject liquid to create a low-pressure region within the discharge duct.

8. A system according to claim 7, wherein the supply duct of the fluidising unit is connected to the discharge chamber such that the supply duct of the fluidising unit is fed with water from the discharge chamber.

9. A system according to claim 8, wherein a common pump is arranged both to pump water from the discharge chamber to the storage tank and to pump the water to the supply duct of the fluidising unit.

10. A system according to claim 2, wherein the supply duct of the fluidising unit is connected to the discharge chamber such that the supply duct of the fluidising unit is fed with water from the discharge chamber.

11. A system according to claim 10, wherein a common pump is arranged both to pump water from the discharge chamber to the storage tank and to pump the water to the supply duct of the fluidising unit.

12. A system according to claim 11, wherein a common tank is formed of plastic material and is divided by partitions into compartments, a first compartment providing the settling chamber, a second compartment providing the discharge chamber, a weir being formed by an upper edge of the one of the partitions separating the first and second compartments; a third compartment containing a hydrocyclone; and a fourth compartment providing a drain having a contaminant outlet at its lower part, the discharge duct from the fluidising unit discharging into the drain compartment and an overflow outlet from the hydrocyclone discharging into the drain compartment; and the pump being mounted to the tank.

13. A system according to claim 1, wherein secondary separation and/or chemical treatment means are provided for treating the water passing from the outlet of the discharge chamber to the storage tank.

14. A system according to claim 13, wherein the secondary separation means comprises a hydrocyclone by means of which lighter than water contaminants are discharged from the water through the hydrocyclone overflow.

15. A system according to claim 14, further comprising a unitary tank being formed of plastic material and being divided by partitions into compartments, a first compartment providing the settling chamber, a second compartment providing the discharge chamber, a weir being formed by an upper edge of the one of the partitions separating the first and second compartments; a third compartment containing the hydrocyclone; and a fourth compartment providing a drain and having a contaminant outlet at its lower part, the discharge duct from the fluidising unit discharging into the drain compartment and the overflow from the hydrocyclone discharging into the drain compartment.

16. A system according to claim 13, wherein the chemical treatment means comprises means for adding chlorine, acid, alkali, scent or colour to the water.

17. A system according to claim 1, in which the settling and discharge chambers are contained in in a common tank, and are separated by a weir which forms the overflow.

18. A system according to claim 17, wherein the common tank is formed of plastic material and is divided by partitions into compartments, a first compartment providing the settling chamber, a second compartment providing the discharge chamber, the weir being formed by an upper edge of the one of the partitions separating the first and second compartments; a third compartment containing a hydrocyclone; and a fourth compartment providing a drain and having a contaminant outlet at its lower part, the discharge duct from the fluidising unit discharging into the drain compartment and an overflow outlet from the hydrocyclone discharging into the drain compartment.

19. A system according to claim 1, further comprising a rainwater collection system having an outlet connected to the settling chamber.

20. A system according to claim 1, further comprising a heat exchanger for recovering waste heat from water from the first distribution system.

* * * * *